(12) United States Patent
Knaup

(10) Patent No.: US 7,065,850 B2
(45) Date of Patent: Jun. 27, 2006

(54) HARDENED MOTOR-VEHICLE PART WITH REPAIR POINT

(75) Inventor: Hans-Jürgen Knaup, Bad Lippsringe (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 63 days.

(21) Appl. No.: 10/831,880

(22) Filed: Apr. 26, 2004

(65) Prior Publication Data

US 2004/0255446 A1 Dec. 23, 2004

(30) Foreign Application Priority Data

Jun. 17, 2003 (DE) .................................. 10327526

(51) Int. Cl.
*B23P 9/00* (2006.01)

(52) U.S. Cl. ................. 29/402.06; 29/401.1; 29/402.1; 29/402.08; 29/402.09; 29/402.11; 29/402.16; 29/432; 29/557

(58) Field of Classification Search ................. 29/557, 29/558, 402.01, 402.03, 402.06, 402.07, 29/402.08, 402.09, 402.11, 402.12, 402.13, 29/402.14, 402.15, 402.16, 402.17, 432, 29/401.1
See application file for complete search history.

(56) References Cited

U.S. PATENT DOCUMENTS

| | | | | |
|---|---|---|---|---|
| 2,664,609 A * | 1/1954 | Kellems | .................. | 294/86.42 |
| 3,792,523 A * | 2/1974 | Grunberger | .................. | 29/557 |
| 4,531,275 A * | 7/1985 | Kelly | ....................... | 29/402.12 |
| 5,842,678 A * | 12/1998 | Svejkovsky | ................. | 248/650 |
| 6,374,490 B1 * | 4/2002 | Miyahara | ................. | 29/890.03 |
| 6,588,087 B1 * | 7/2003 | Collins | ......................... | 29/557 |
| 6,878,220 B1 * | 4/2005 | Gehringhoff et al. | ....... | 148/654 |

FOREIGN PATENT DOCUMENTS

DE        10149221        8/2002

* cited by examiner

*Primary Examiner*—Essama Omgba
(74) *Attorney, Agent, or Firm*—Andrew Wilford

(57) ABSTRACT

A hardened metal part is created having a pair of opposite faces and a dimple open at one of the faces and forming a pocket. This hardened metal part is installed in a motor vehicle over an element of the vehicle with the one face turned toward and the dimple aligned with a specific region of the element. Then at a later date when the region needs to be accessed, the dimple is ground off so as to form the pocket into a throughgoing hole and thereby expose the region through the hole so that a tool can act on the region through the hole.

4 Claims, 1 Drawing Sheet

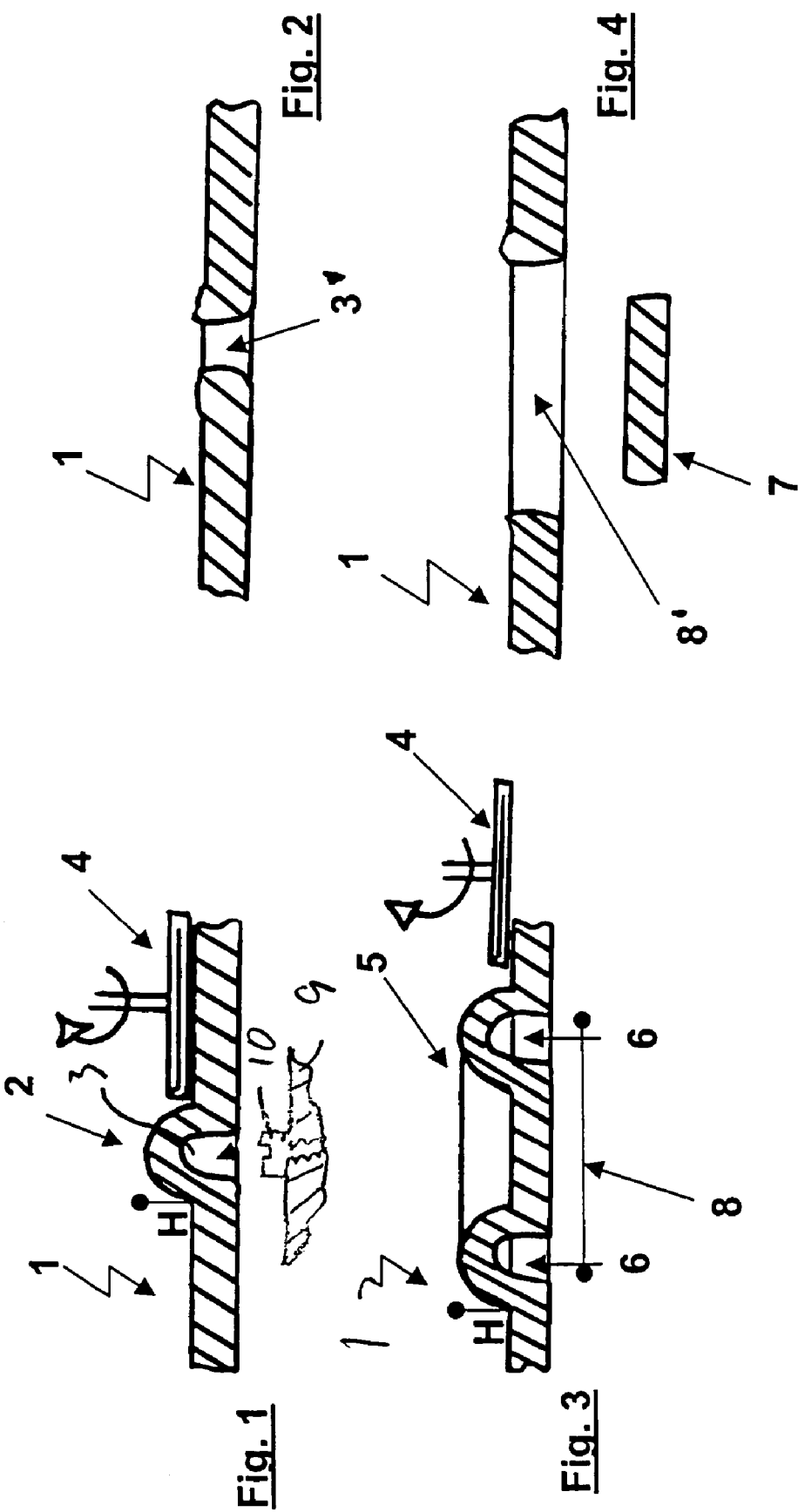

HARDENED MOTOR-VEHICLE PART WITH REPAIR POINT

FIELD OF THE INVENTION

The present invention relates to a hardenable motor-vehicle part. More particularly this invention concerns such a part that is specifically set up so that an aperture can be formed in it as a repair point and a method of making and using such a part.

BACKGROUND OF THE INVENTION

In the construction of a motor vehicle various elements are made of hardened steel. The B-columns, for instance, are typically made of an extremely strong boron-alloyed steel having a tensile strength of about 1500 N/mm². Such a part is produced by a complex manufacturing process and is subsequently mounted on the motor-vehicle frame during the assembly of the vehicle.

A process is known from German patent 101 49 221 of Gehringhoff whereby an unhardened blank is formed with a rough bump or dimple that either constitutes a point at which an aperture is subsequently formed or that is a centering or mounting location used in the subsequent installation of the part. The dimpled unhardened blank is then fitted in a die and is simultaneously heat treated and deformed, and even if necessary punched out, so that the finished piece is hardened and has the exact end shape desired.

The problem with such parts is that when a repair has to be subsequently made it is extremely difficult or impossible to drill a hole through them to get at an underlying element. With a B-column, for example, screws holding up interior structure are covered by the B-column so that if subsequently the interior structure needs work, it is essentially impossible to get at these screws and do the necessary work. As a result the column has to be cut out, or the repair has to be conducted from inside, resulting in an unsatisfactory messy job.

OBJECTS OF THE INVENTION

It is therefore an object of the present invention to provide an improved hardened metal part and an improved method of producing the part, using the part, and conducting a repair through the part.

Another object is the provision of such an improved hardened metal part which overcomes the above-given disadvantages, that is which makes it relatively easy to form hole or aperture to get at underlying structures.

SUMMARY OF THE INVENTION

According to the invention a hardened metal part is created having a pair of opposite faces and a dimple open at one of the faces and forming a pocket. This hardened metal part is installed in a motor vehicle over an element of the vehicle with the one face turned toward a specific region of the element and the dimple aligned with the specific region of the element. Then at a later date when the region needs to be accessed, the dimple is machined off so as to form the pocket into a throughgoing hole and thereby expose the region through the hole so that a tool can act on the region through the hole.

The dimple can in fact be formed in an unhardened blank that is subsequently hardened, so that its formation adds no significant cost to the part. The location of the dimple can be controlled closely enough for the purposes of this invention with no great care. Subsequently when the region of the underlying vehicle element into which the part has been installed needs to be accessed, the repair crew can machine off the dimple to create the necessary access hole. The dimple can be removed by milling or, more likely, grinding so that the nearly impossible task of drilling a hole in, for instance, a boron-alloyed part is eliminated. Alternately a cutting torch can be used to remove the bump. Before it is cut or machined off, the bump does not affect the strength of the part at all, and due to it shape, even if it is machined off the welt around it leaves the workpiece virtually as strong as beforehand.

According to the invention the dimple is formed by an annular ridge and the pocket is annular so that when the dimple is machined off a portion defined within the ridge is freed from the part. This makes it possible to form a relatively large hole in the part.

The pocket in accordance with the invention extends past the other face. This ensures that when it is ground off generally flush with the other face, a throughgoing hole is formed.

After the repair is done according to the invention the hole can be closed by welding a plug in or over it.

In fact the system of this invention can be used to cut the part in two. In this case the dimple is formed as a ridge extending from one edge of the part to another. Machining off the ridge thus will cut the part in two.

BRIEF DESCRIPTION OF THE DRAWING

The above and other objects, features, and advantages will become more readily apparent from the following description, reference being made to the accompanying drawing in which:

FIG. 1 is a section through a part according to the invention before an aperture is formed in it;

FIG. 2 is a section through the part after the aperture is formed; and

FIGS. 3 and 4 and views like respective FIGS. 1 and 2 showing another part with a larger aperture.

SPECIFIC DESCRIPTION

As seen in FIG. 1 a part 1 is produced that is of a boron-alloyed, very hard steel. It has a bump or dimple 2 having a height H and forming a blind hole or pocket 3 that is so deep that the pocket 3 extends past the face of the part 1 opposite the face at which it opens. This part 1 is produced normally in a separate machining/hardening operation and is supplied to a vehicle fabricator for installation, for example, as a B-column in a motor vehicle. The bump 2 is oriented when installed opposite an interior element 9 having a region or screw 10 opposite the bump 2, with the bump 2 projecting outward away from the underlying element 9.

According to the invention if at a later date it is necessary, for example for repair purposes, to get access to the screw 10, a grinder 4 is used to machine off the bump 2. This converts the pocket 3 into a throughgoing hole 3' through which a tool can be inserted to operate the screw 10. After the repair is made, the hole 3' can be closed up, for instance by welding a plug into or over it.

FIGS. 3 and 4 show how, instead of a simple dome-shaped dimple, an annular ridge 5 forming an annular groove or pocket 6 can be formed in the part 1 to delimit a circular region 8 of the workpiece. Here the grinder 4 can remove the ridge 5 to cut out a piece 7 and form a hole 8' as shown in FIG. 4. Once again, after the necessary repair is carried out through the hole 8', it can be plugged.

I claim:

1. A method comprising the steps of:
    forming a metal part having a pair of opposite faces and a dimple open at one of the faces, projecting from the other of the faces, and forming a pocket open only at the one face;
    subsequently hardening the metal part with the dimple;
    subsequently installing the hardened metal part in a motor vehicle over an element of the vehicle with the one face turned toward a specific region of the element and the dimple aligned with the specific region of the element; and
    subsequently for repair purposes machining off the dimple so as to form the pocket into a throughgoing hole and thereby expose the region through the hole, whereby a tool can act on the region through the hole.

2. The method defined in claim 1 wherein the dimple is formed by an annular ridge and the pocket is annular, whereby when the dimple is machined off a portion defined within the ridge is freed from the part.

3. The method defined in claim 1 wherein the pocket extends past the other face.

4. The method defined in claim 1 wherein the dimple is machined off by grinding.

* * * * *